US012640930B2

(12) United States Patent
Uiterwijk et al.

(10) Patent No.: US 12,640,930 B2
(45) Date of Patent: May 26, 2026

(54) REDUCING NETWORK LOAD AND LEAD TIME FOR SIGNING A PACKAGE MANAGER FILE

(71) Applicant: Red Hat, Inc., Raleigh, NC (US)

(72) Inventors: Patrick Martijn Andreas Uiterwijk, Houten (NL); Pierre-Yves Chibon, Puteaux (FR); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 253 days.

(21) Appl. No.: 18/215,637

(22) Filed: Jun. 28, 2023

(65) Prior Publication Data

US 2025/0007725 A1     Jan. 2, 2025

(51) Int. Cl.
  *H04L 9/32*         (2006.01)
  *G06F 8/61*         (2018.01)
  *H04L 69/22*        (2022.01)

(52) U.S. Cl.
  CPC .............. *H04L 9/3247* (2013.01); *G06F 8/61* (2013.01); *H04L 69/22* (2013.01)

(58) Field of Classification Search
  None
  See application file for complete search history.

(56) References Cited

U.S. PATENT DOCUMENTS

2016/0127329 A1*  5/2016  Raghupathy ........ G06F 21/6245
                                                   380/270
2016/0365981 A1*  12/2016  Medvinsky ............. G06F 21/57

2021/0409229 A1*  12/2021  Chan ..................... H04L 63/123
2022/0141028 A1*  5/2022  Onnainty .............. H04L 9/3239
                                                   713/193
2023/0261871 A1*  8/2023  McCombes ........... H04L 9/3213
                                                   713/159

FOREIGN PATENT DOCUMENTS

CN       112948847 A  *  6/2021  ............. G06F 16/27
CN       113204798 A  *  8/2021  ............. G06F 21/45
CN       113553114 A  *  10/2021  ........... G06F 21/602

OTHER PUBLICATIONS

Github, "Phasing Out Header+Payload Digests and Signatures #863", located at https://github.com/rpm-software-management/rpm/issues/863, published on Sep. 25, 2019, 4 pages.

(Continued)

*Primary Examiner* — Younes Naji
(74) *Attorney, Agent, or Firm* — Womble Bond Dickinson (US) LLP

(57)            ABSTRACT

Techniques for signing a package manager file are disclosed. An example method includes receiving, at a signing client, a package manager file and a signing request to cryptographically sign the package manager file. The package manager file includes a header and a payload. The method also includes inspecting the header of the package manager file to determine whether the header includes a digest comprising a hash of the payload. Responsive to determining that the header does include the digest, the method also includes sending the header from the signing client to a signing server without sending the payload, and receiving a signed header from the signing server.

20 Claims, 6 Drawing Sheets

(56)                References Cited

OTHER PUBLICATIONS

Sidhpurwala, Red Hat Blog "Securing RPM signing keys", located at https://www.redhat.com/en/blog/securing-rpm-signing-keys, published Mar. 7, 2018, 6 pages.

Github, "Stop adding rpm v3 header+payload signatures by default where not needed", located at https://github.com/rpm-software-management/rpm/commit/b1aeafef49721d565fcd02ce5e37b653bd96559e, 4 pages.

Rpmsign(8)—Linux manual page, located at https://man7.org/linux/man-pages/man8/rpmsign.8.html, 4 pages.

Kline, "Adding SHA256 Digests to RPMS", Star Lab Software, located at https://www.starlab.io/blog/adding-sha256-digests-to-rpms, 6 pages.

* cited by examiner

400

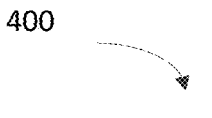

Receiving, at a signing client, a package manager file and a signing request 402

Inspecting the header of the package manager file to determine whether the header includes a digest comprising a hash of the payload 404

Sending header without the payload from the signing client to a signing server 406

By processing device of the signing server, generating a cryptographic signature for the header, inserting the signature into a signature field of the header to generate a signed header, and sending the signed header to the signing client 408

Fig. 4

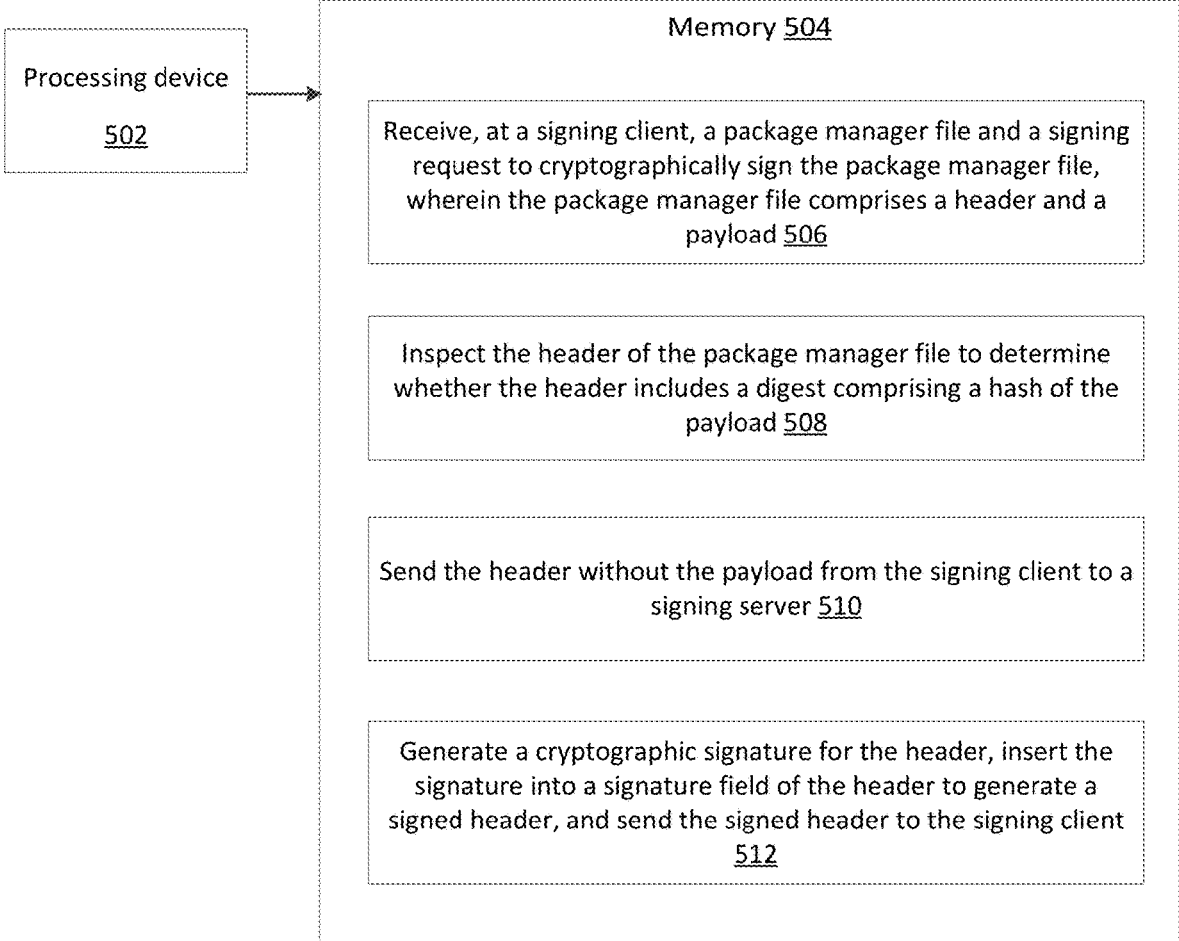

Processing device
502

Memory 504

Receive, at a signing client, a package manager file and a signing request to cryptographically sign the package manager file, wherein the package manager file comprises a header and a payload 506

Inspect the header of the package manager file to determine whether the header includes a digest comprising a hash of the payload 508

Send the header without the payload from the signing client to a signing server 510

Generate a cryptographic signature for the header, insert the signature into a signature field of the header to generate a signed header, and send the signed header to the signing client 512

REDUCING NETWORK LOAD AND LEAD TIME FOR SIGNING A PACKAGE MANAGER FILE

TECHNICAL FIELD

Aspects of the present disclosure relate to techniques for signing a package manager file such as an RPM package manager file.

BACKGROUND

A package manager is a collection of software tools used for installing and configuring software on a computer system. A package manager can generate a package manager file that includes the executables and other files to be distributed to end users. To install software, the user can execute the package manager file to control the installation of the files on the computer. One such package manager is the RPM package manager (previously referred to as "Red Hat Package Manager"), which is used to distribute and install software on Linux operating systems using the ".rpm" file format. Package manager files are usually signed using a private cryptographic key to ensure that the software is authentic and has not been tampered with or otherwise corrupted.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 4 is a process flow diagram summarizing a method of signing a package manager file, in accordance with some embodiments of the present disclosure.

FIG. 5 is a simplified block diagram of a system for signing a package manager file, in accordance with some embodiments of the present disclosure.

DETAILED DESCRIPTION

Figure 1:
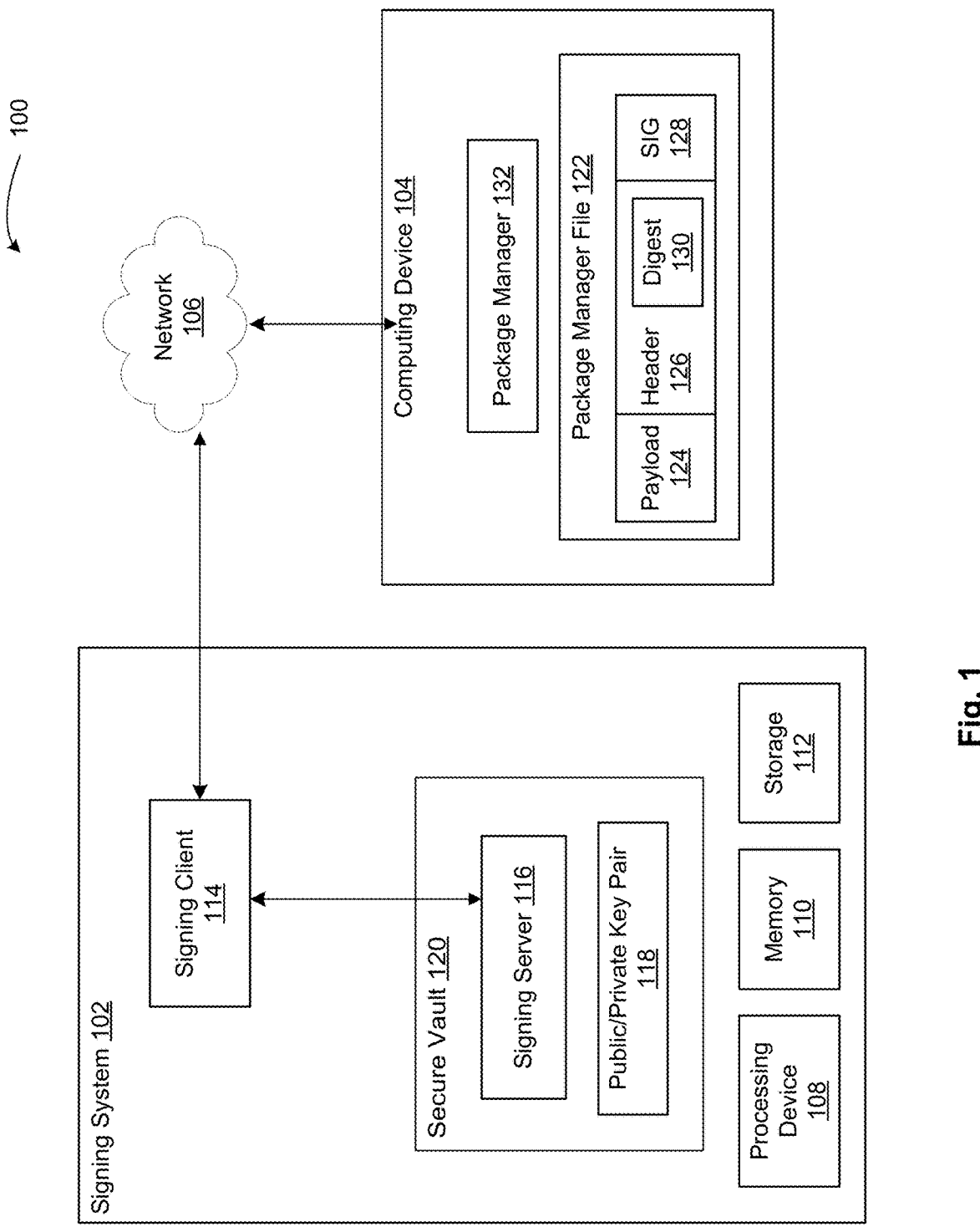
FIG. 1 is a block diagram of an example system for signing a package manager file, in accordance with some embodiments of the present disclosure.

Aspects of the present disclosure relate to techniques for signing a package manager file, such as an RPM package manager file. To prepare a software package for distribution, software developers can generate a package manager file that includes the software to be loaded onto a user computer system. Package manager files are often cryptographically signed to prevent tampering. For the signing process, the developer can send the package manager file to a trusted third party that operates a signing host. The signing host signs the package manager file with a private encryption key and then publishes the corresponding public key to allow end users to verify the integrity of the package manager file before installing the software.

Signing package manager files often involves a very secure process, designed in such a way that an attacker entering the network could not gain access to the signing host. Accordingly, the signing server may be hosted within a separate computing system sometimes referred to as a secure vault. In many cases, signing a package manager file involves sending the entire package manager file to the signing server over a network. The signing server then signs the headers and the payload and sends back the entire signed package manager file back over the network to be delivered the requesting party.

Sending the entire package manager file back and forth over the network for the signing process is time-consuming and resource-consuming. It can limit the ability of a given infrastructure to cope with a sudden spike in signing requests, such as during mass-rebuilds when all or a large subset of the binary files present in a RPM repository are rebuilt automatically. For example, a mass rebuild may be conducted when introducing a new version of an operating system or other software package, leading to the need to recompile all related source code. This can result in huge delays on other signing requests as well as significant traffic and load on the network.

Embodiments of the present techniques describe an improved workflow for signing package manager files. The package manager file may be a file that includes several sections, including a payload, a header, and a signature field. The payload is a binary formatted archive of the files to be written to the file system. The header is an index that contains information about the package manager file, such as the file type and package manager file version. In some cases, the header includes a payload digest, which is a field that includes a hash of the binary payload.

In accordance with the present techniques, the signing system is configured to include a signing client running on a regular system and a signing server running in a secure vault. The signing client receives the signing requests over a network and inspects the package manager file associated with the request. If the package manager file does not include a payload digest, then the entire package manager file is sent to the signing server. The signing server then generates the signature using header and the payload. The signing server inserts the resulting signature into the header and sends the entire signed package manager file back to the signing client for delivery to the requesting party.

If the package manager file does include a payload digest then only the headers are sent to the signing server. The signing server then generates the signature using only the headers received from the signing client. The signing server sends back the signature to the signing client, which inserts the signature into the signature field before delivering the signed package manager file to the requesting party. This approach eliminates the need to send the entire package manager file back and forth between the signing client and the signing server, allowing the process to use much fewer network resources. Additionally, since the signing server is not handling the processing of the package manager file, the speed of the signing process performed by the signing is dramatically increased.

Since the package manager file's header contains a reference (i.e., the payload digest) to the binary payload of the package manager file, both the payload digest in the header and the binary payload need to be changed together. If only one of them is updated, the resulting RPM file would be corrupted. Thus, if a bad actor were to change the payload only, it would corrupt the package manager file and would fail in the verification process. Aspects of the present disclosure may be described herein with reference to RPM package manager files. However, it will be appreciated that the techniques described herein can also be applied to other types of package managers.

FIG. 1 is a block diagram of an example system 100 for signing a package manager file, in accordance with some embodiments of the present disclosure. One skilled in the art will appreciate that other architectures are possible for system 100 and that the implementation of the system is not necessarily limited to the specific architecture depicted by FIG. 1. The system 100 may include a signing system 102, which may be coupled to a computing device 104 through a network 106. The computing system 102 may be a cloud-based infrastructure configured, for example, as Service as a Service (SaaS) or Platform as a Service (PaaS). The computing system 102 may also be a non-cloud-based system such as a personal computer, one or more servers communicatively coupled through a network, and other configurations.

The computing device 104 may be operated, for example, by a software developer and may be any suitable type of computing device or machine that has a programmable processor including, for example, server computers, desktop computers, laptop computers, tablet computers, smartphones, set-top boxes, etc. In some examples, each of the computing device 104 may be a single machine or may include multiple interconnected machines (e.g., multiple servers configured in a cluster). The singing system 102 and computing device 104 may be implemented by a common entity/organization or may be implemented by different entities/organizations.

The network 106 may be a public network (e.g., the internet), a private network (e.g., a local area network (LAN) or wide area network (WAN)), or a combination thereof. In one embodiment, the network 106 may include a wired or a wireless infrastructure, which may be provided by one or more wireless communications systems, such as a WiFi hotspot connected with the network 106 and/or a wireless carrier system that can be implemented using various data processing equipment, communication towers (e.g. cell towers), etc. In some embodiments, the network 106 may be an L3 network. The network 106 may carry communications (e.g., data, message, packets, frames, etc.) between the computing system 102 and the computing devices 104.

The computing system 102 can include one or more processing devices 108 (e.g., central processing units (CPUs), graphical processing units (GPUs), etc.), main memory 110, which may include volatile memory devices (e.g., random access memory (RAM)), non-volatile memory devices (e.g., flash memory) and/or other types of memory devices, and a storage device 112 (e.g., one or more magnetic hard disk drives, a Peripheral Component Interconnect [PCI] solid state drive, a Redundant Array of Independent Disks [RAID] system, a network attached storage [NAS] array, etc.). In certain implementations, main memory 110 may be non-uniform access (NUMA), such that memory access time depends on the memory location relative to processing device 108. The storage device 112 may be a persistent storage and may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. The storage device 112 may be configured for long-term storage of data. It should be noted that although, for simplicity, a single processing device 108, main memory 110, storage device 112, are shown, other embodiments may include a plurality of processing devices, memories, and storage devices. Additionally, the computing system 102 may have additional components not shown in FIG. 1. The computing device 104 may include similar architectures.

The signing system 102 includes a signing client 114 and a signing server 116. The signing client 114 can receive signing requests from the computing device 104 and perform various actions to process the signing request as described further herein. The signing server 116 receives signing requests from the signing client 114 and generates the signatures for the package manager files 122 using a pair of public and private encryption keys 118. The signing server 116 may generate signatures using any suitable encryption program, such as Pretty Good Privacy (PGP), OpenPGP, and others. The signing server 116 is implemented within a secure vault 120 to ensure the that the signing server 116 and private keys are not accessible to unauthorized actors. The secure vault 120 is a secure computing system for storing, retrieving, sharing, and recovering security-sensitive data that should only be accessible by a limited group of people or entities. The secure vault 120 may use heightened security protocols to protect the security of the signing server 116. For example, the signing server 116 may be password protected and may be configured to be accessed by a limited number of users enrolled in an identity management domain (IDM). Data stored to the signing server 116 may also be encrypted using symmetric or asymmetric encryption keys. The signing client 114 and the signing server 116 may be connected by a private internal network, such a local area network (LAN), a wide area network (WAN)), or a combination thereof.

The computing device 104 includes a package manager file 122, which may be any suitable type of package manager file including RPM version 3, version 4, or later versions. The package manager 132 is a software tool that enables the developer to automate the process of software installation and maintenance. The package manager 132 is configured to gather the files to be distributed with a software package and generate the package manager file 122 that can be distributed to end users for installing the software.

The package manager file 122 includes a payload 124, a header 126, and a signature field 128. The payload 124 may be a binary file that includes the files and programs of a software package to be written to the target file system by the package manager file 122. In some embodiments, the payload 124 may be generated by a file archiver such as cpio, pax, and others. The header 126 is an index that can include information about the package manager file 122, such as the file type, package manager version, package name, package version, architecture, file list, among other possible information. Depending on the type of package manager and/or the version, the header 126 may include a digest 130, which is a field that includes a hash of the binary payload 124. The hash may be an encoding of the payload 124 using a cryptographic hash function such as Secure Hash Algorithm 256 (SHA-256), SHA-512, and others.

The signature field 128 is used to store a signature that enables the recipient the ability to verify that the package manager file 122 was not modified after the package manager file 122 was signed. The signature is generated by the signing server 116. To initiate the signature generation, the computing device 104 sends a signing request to the signing system 102 through the signing client 114, which receives the connection from the computing device 104 and handles all communications between the signing system 102 and the computing device 104. The request from the computing device 104 can include the package manager file 122 to be signed.

The signing client 114 can inspect the header 126 of the package manager file 122 do determine, for example, the file type and version of the package manager file 122, among and other information. The signing client 114 then sends a signing request to the signing server 116, which generates the signature. The specific process for generating the signature may depend on whether the header 126 of the package manager file 122 includes a digest 130. If the header 126 does not include a digest 130, the entire package manager file 122 is sent to the signing server 116, which generates the signature from the entire package manager file 122. If the header 126 does include a digest 130, then only the header 126 is sent to the signing server 116, which generates the signature from the header 126, including the digest 130 and the other fields included in the header 126.

In some embodiments, the presence of the digest 130 may be determined based on the package manager file version or type. For example, if the package manager file 122 is RPM version 3, it can be determined that the header 126 does not include a digest 130. If the package manager file 122 is RPM version 4, then it can be determined that the header 126 does include a digest 130. In some embodiments, the presence of the digest 130 may be determined directly by inspecting the header 126 to determine whether the header 126 includes a digest field, and/or whether the digest field includes a digest or is empty.

After the signature is generated, the signature is added to the signature field 128 of the package manager file 122 and the resulting signed package manager file 122 is returned to the computing device 104. The private key used to generate the signature is kept within the secure vault 120. The corresponding public key may be published or otherwise made available to end users. For example, the public key may be included with the relevant software package. Before the software is installed on a computing system of the end user, a cryptographic integrity check is performed using the public key to ensure that the package manager file 122 has not been modified. The cryptographic integrity check can be expected to fail if the payload 124 or any field of the header 126 has been modified since the package manager file 122 was signed.

Figure 2:
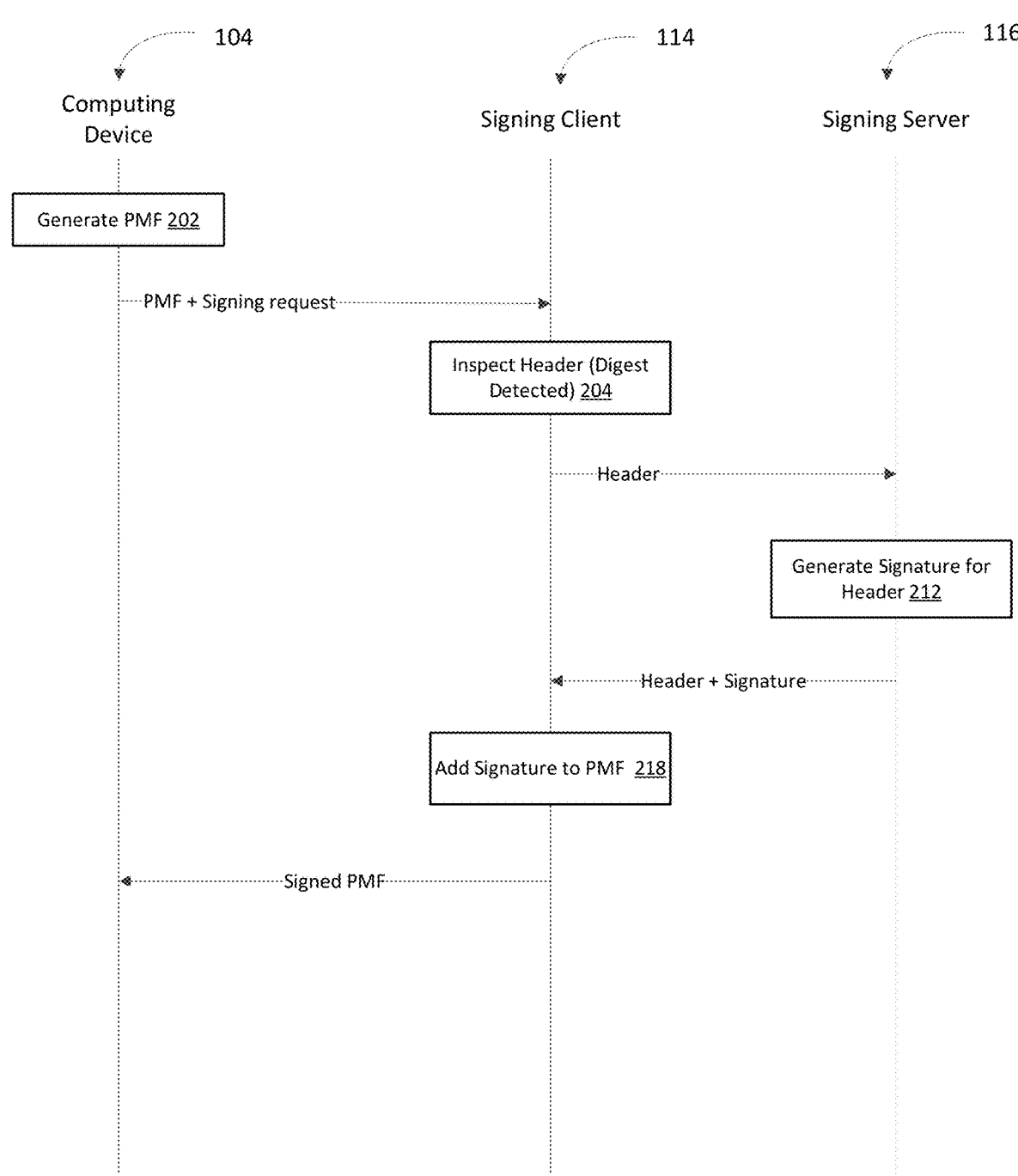
FIG. 2 is a diagram depicting a signing workflow, in accordance with some embodiments of the present disclosure.

FIG. 2 is a diagram depicting a signing workflow, in accordance with some embodiments of the present disclosure. With reference to FIG. 1, the workflow 200 is performed between the computing device 104, the signing client 114, and the signing server 116.

At block 302, the computing device 104 generates a package manager file 122, which includes a header 126. The header 126 may be generated automatically by the package manager 132 during the building of the package manager file 122. In some embodiments, one or more elements of the header 126 may also be generated manually. In the example shown in FIG. 2, the header 126 includes a digest 130, which is a hash of the package manager file's payload 124. For example, the package manager in this example may be RPM version 4 or later.

To initiate the workflow, the computing device 104 sends the package manager file 122 and signing request to the signing client 114. At block 204, after receiving the signing request, the signing client 114 inspects the header 126 of the package manager file 122 to determine if the header 126 includes a digest 130. In this example, the signing client 114 determines that the header 126 includes a digest 130 (digest detected). Responsive to detecting the digest, the signing client 114 sends the header 126 to the signing server 116 but does not send the payload 124.

At block 212, the signing server 116 generates the cryptographic signature for the header 126 and then returns the header 126 and the signature to the signing client 114.

At block 218, after receiving the header 126 and signature, the corresponding package manager file 122 is identified based on data in the header 126 and the signing client 114 adds the signature to the signature field 128 of the package manager file 122. The signing client 114 then returns the signed package manager file 122 to the computing device 104 associated with the request.

It can be appreciated that the workflow 200 may include additional processes not depicted. For example, as described above, the signing server 116 and/or signing client 114 may associate the corresponding public key with the package manager file 122 and distribute the public key by, for example, sending the public key to the computing device 104, publishing the public key, or otherwise making the public key available for end users.

Figure 3:
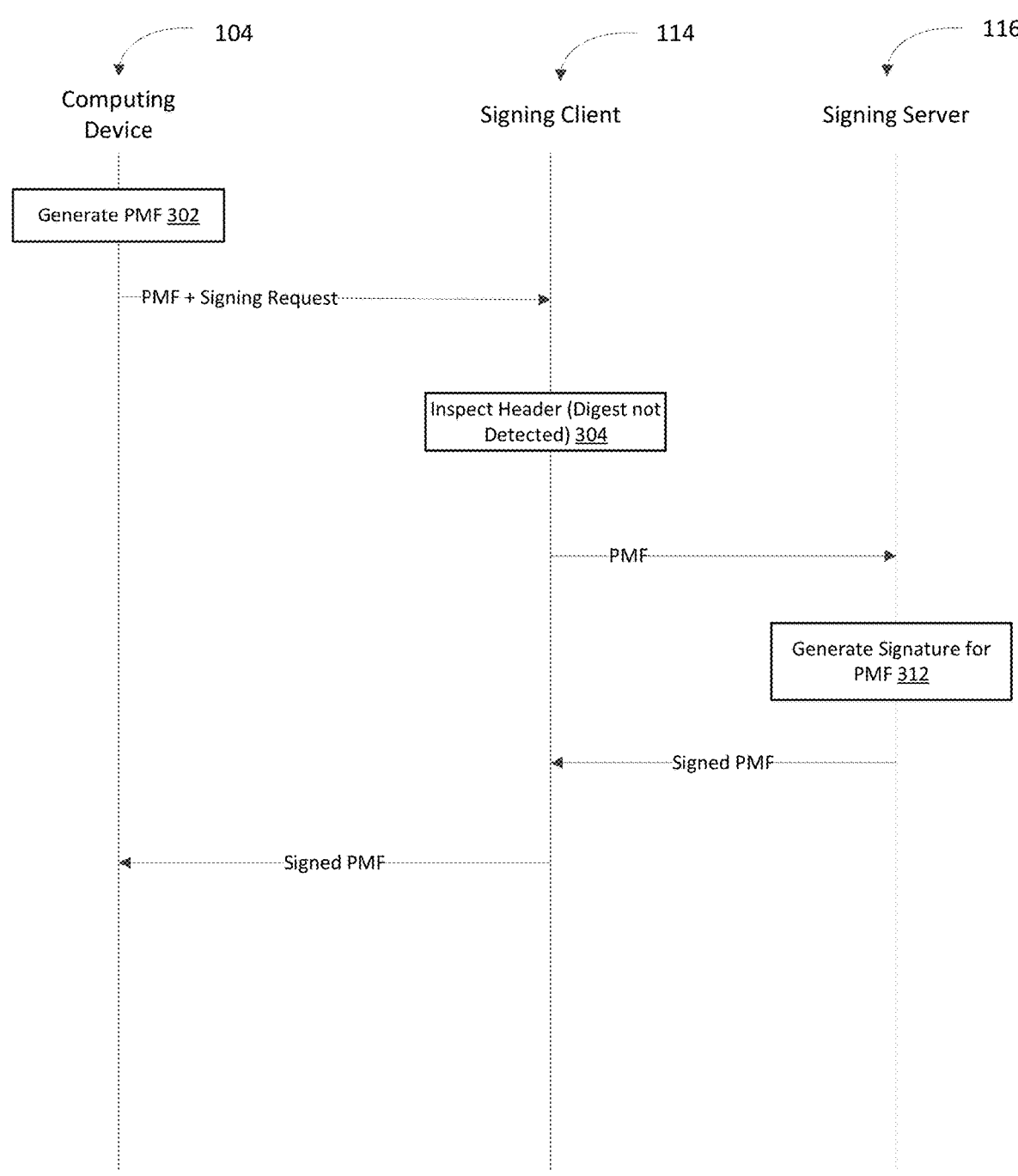
FIG. 3 is a diagram depicting another signing workflow, in accordance with some embodiments of the present disclosure.

FIG. 3 is a diagram depicting another signing workflow, in accordance with some embodiments of the present disclosure. With reference to FIG. 3, the workflow 300 is performed between the computing device 104, the signing client 114, and the signing server 116.

At block 302, the computing device 104 generates a package manager file 122, which includes a header 126. The header 126 may be generated automatically by the package manager 120 during the building of the package manager file 122. In some embodiments, one or more elements of the header 126 may also be generated manually. In the example shown in FIG. 3, the header 126 does not include a digest corresponding to the package manager file's payload 124. For example, the package manager in this example may be RPM version 3 or earlier.

To initiate the workflow, the computing device 104 sends the package manager file 122 and signing request to the signing client 114. At block 304, after receiving the signing request, the signing client 114 inspects the header 126 of the package manager file 122 to determine if the header 126 includes a digest 130. In this example, the signing client 114 determines that the header 126 does not include a digest 130 (digest not detected). Responsive to detecting that the header 126 does not include a digest, the signing client 114 sends the entire package manager file 122 to the signing server 116, including the payload 124.

At block 312, the signing server 116 generates the cryptographic signature for the package manager file 122 and adds the signature to the signature field 128 of the package manager file 122. The signing server 116 then returns the signed package manager file 122 to the signing client 114. The signing client 114 then returns the signed package manager file 122 to the computing device 104 associated with the request.

It can be appreciated that the workflow 300 may include additional processes no depicted. For example, as described above, the signing server 116 and/or signing client 114 may associate the corresponding public key with the package manager file 122 and distribute the public key by, for example, sending the public key to the computing device 104, publishing the public key, or otherwise making the public key available for end users.

FIG. 4 is a process flow diagram summarizing a method of signing a package manager file, in accordance with some embodiments of the present disclosure. Method 400 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, aspects of the method 400 may be performed by the signing client 114 and/or the signing server 116 of FIG. 1. The method may begin at block 402.

At block 402, the signing client receives a package manager file and a signing request to cryptographically sign the package manager file. The package manager file includes a header and a payload.

At block 404, the header of the package manager file is inspected to determine whether the header includes a digest containing a hash of the payload. Inspecting the header may be performed by the signing client and may involve determining whether the header includes a digest field and/or whether the digest field includes a valid value. Inspecting the header may also involve identifying a type of package manager and/or a version of a package manager that was used to generate the package manager file based on other metadata included in the header.

Block 406 and 408 may be performed in response to a determination that the header does include the digest. At block 406, the header, without the payload, is sent from the signing client to a signing server. At block 408, a processing device of the signing server generates a cryptographic signature for the header, inserts the signature into a signature field of the header to generate a signed header, and sends the signed header to the signing client. Responsive to receiving the signed header the signing client can insert the signature into the signature field of the package manager file to generate a signed package manager file and return the signed package manager file to a computing device from which the signing request was received.

It will be appreciated that embodiments of the method 400 may include additional blocks not shown in FIG. 4 and that some of the blocks shown in FIG. 4 may be omitted. For example, if the header does not include a digest then blocks 406 and 408 may be omitted and the method may include, responsive to determining that the header does not include the digest, sending the package manager file, including the payload, from the signing client to the signing server. The signing server may then generate a cryptographic signature for the package manager file, insert the signature into a signature field of the package manager file to generate the signed package manager file, and send the signed package manager file to the signing client.

FIG. 5 is a simplified block diagram of a system for signing a package manager file, in accordance with some embodiments of the present disclosure. The system 500 includes a processing device 502 operatively coupled to a memory 504. The memory 504 can include instructions that are executable by the processing device 502 to cause the processing device 502 to generate a signature for a package manager file.

The memory 504 includes instructions 506 to receive, at a signing client, a package manager file and a signing request to cryptographically sign the package manager file, wherein the package manager file comprises a header and a payload. The memory 504 also includes instructions 508 to inspect the header of the package manager file to determine whether the header includes a digest comprising a hash of the payload.

The memory 504 also includes instructions 510 to send the header without the payload from the signing client to a signing server. The memory 504 also includes instructions 512 that cause the signing server to generate a cryptographic signature for the header, insert the signature into a signature field of the header to generate a signed header, and send the signed header to the signing client. Instructions 510 and 512 may be executed responsive to determining that the header does include the digest.

It will be appreciated that embodiments of the system 500 may include additional blocks not shown in FIG. 5 and that some of the blocks shown in FIG. 5 may be omitted. For example, the memory 504 may also include instructions to be executed when the package manager file does not include the digest, in which case the entire package manager file would be sent to the signing sever, including the payload. The instructions would cause the signing server to generate a cryptographic signature for the package manager file, insert the signature into a signature field of the package manager file to generate the signed package manager file, and send the signed package manager file to the signing client.

Figure 6:
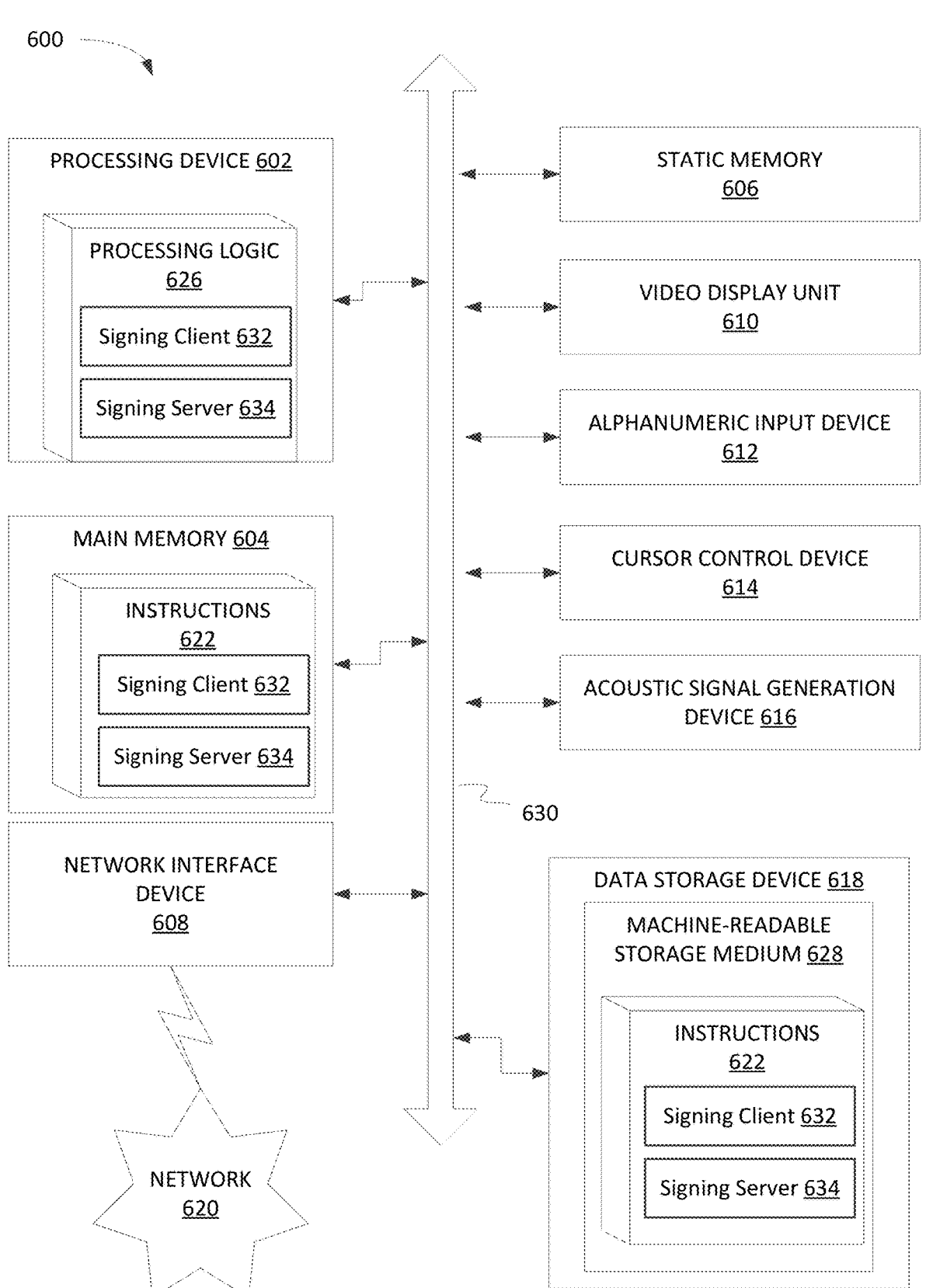
FIG. 6 illustrates a diagrammatic representation of a machine in the example form of a computer system within which a set of instructions, for causing the machine to perform any one or more of the methodologies discussed herein, may be executed.

FIG. 6 illustrates a diagrammatic representation of a machine in the example form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a web appliance, a server, and other machines capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server, such as a cloud server, configured as a developer platform for building, storing, testing, and distributing software packages.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626 for performing the operations and steps discussed herein. For example, the processing logic 626 may include logic for performing the functions of a signing client 632 or a signing server 634.

The data storage device 618 may include a machine-readable storage medium 628, on which is stored one or more set of instructions 622 (e.g., software) embodying any one or more of the methodologies of functions described herein, including instructions to cause the processing device 602 to perform the functions of the signing client 632 or the signing server 634. The instructions 622 may also reside, completely or at least partially, within the main memory 604 or within the processing device 602 during execution thereof by the computer system 600; the main memory 604 and the processing device 602 also constituting machine-readable storage media. The instructions 622 may further be transmitted or received over a network 620 via the network interface device 608.

While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "inspecting," "inserting," "identifying," "transmitting," "sending," "storing," "determining," "processing," "generating," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112(f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
receiving, at a signing client, a package manager file and a signing request to cryptographically sign the package manager file, wherein the package manager file comprises a header and a payload;
inspecting the header of the package manager file to determine whether the header includes a digest comprising a hash of the payload based at least on a version of a package manager and a type of the package manager used to generate the package manager file; and
responsive to determining that the header does include the digest:
sending, by a processing device of the signing client, the header to a signing server without sending the payload; and
receiving a signed header from the signing server.

2. The method of claim 1, comprising, responsive to receiving the signed header by the signing client:
obtaining a cryptographic signature from the header, wherein the cryptographic signature was generated by the signing server; and
inserting the cryptographic signature into a signature field of the package manager file to generate a signed package manager file and returning the signed package manager file to a computing device from which the signing request was received.

3. The method of claim 1, comprising:
receiving, at the signing client, a second package manager file and a second signing request to cryptographically sign the second package manager file, wherein the second package manager file comprises a second header and a second payload;
inspecting the second header of the second package manager file to determine whether the second header includes a second digest; and
responsive to determining that the second header does not include the second digest:
sending the second package manager file including the second payload from the signing client to the signing server; and
receiving a second signed package manager file from the signing server.

4. The method of claim 1, wherein the signing server is implemented within a secure vault.

5. The method of claim 1, wherein inspecting the header to determine whether the header includes the digest comprises determining whether the header includes a digest field.

6. The method of claim 1, wherein inspecting the header of the package manager file to determine whether the header includes the digest comprising the hash of the payload comprises identifying the version of the package manager used to generate the package manager file.

7. The method of claim 1, wherein the package manager file is generated by the package manager.

8. A system comprising:
a memory; and
a processing device, operatively coupled to the memory, the processing device to:
receive, at a signing client, a package manager file and a signing request to cryptographically sign the package manager file, wherein the package manager file comprises a header and a payload;
inspect the header of the package manager file to determine whether the header includes a digest comprising a hash of the payload based at least on a version of a package manager and a type of the package manager used to generate the package manager file; and
responsive to determining that the header does include the digest:
send the header from the signing client to a signing server without sending the payload; and
receive a signed header from the signing server.

9. The system of claim 8, wherein the signing client, responsive to receipt of the signed header:
obtains a cryptographic signature from the header, wherein the cryptographic signature was generated by the signing server; and
inserts the cryptographic signature into a signature field of the package manager file to generate a signed package manager file and returns the signed package manager file to a computing device from which the signing request was received.

10. The system of claim 8, wherein, responsive to determining that the header does not include the digest, the processing device is to:
receive, at the signing client, a second package manager file and a second signing request to cryptographically sign the second package manager file, wherein the second package manager file comprises a second header and a second payload;
inspect the second header of the second package manager file to determine whether the second header includes a second digest; and
responsive to determining that the second header does not include the second digest:
send the second package manager file including the payload from the signing client to the signing server; and
receive a second signed package manager file from the signing server.

11. The system of claim 8, wherein the signing server is implemented within a secure vault.

12. The system of claim 8, wherein to inspect the header to determine whether the header includes the digest comprises to determine whether the header includes a digest field.

13. The system of claim 8, wherein to inspect the header to determine whether the header includes the digest comprises to identify the version of the package manager used to generate the package manager file.

14. The system of claim 8, wherein the package manager file is generated by the package manager.

15. A non-transitory computer-readable storage medium including instructions that, when executed by a processing device, cause the processing device to:

receive, at a signing client, a package manager file and a signing request to cryptographically sign the package manager file, wherein the package manager file comprises a header and a payload;

inspect the header of the package manager file to determine whether the header includes a digest comprising a hash of the payload based at least on a version of a package manager and a type of the package manager used to generate the package manager file; and responsive to determining that the header does include the digest:

send, by the processing device, the header from the signing client to a signing server without sending the payload; and receive a signed header from the signing server.

16. The non-transitory computer-readable storage medium of claim 15, wherein the signing client, responsive to receipt of the signed header:

obtains a cryptographic signature from the header, wherein the cryptographic signature was generated by the signing server; and inserts the cryptographic signature into a signature field of the package manager file to generate a signed package manager file and returns the signed package manager file to a computing device from which the signing request was received.

17. The non-transitory computer-readable storage medium of claim 15, comprising instructions that cause the processing device to:

receive, at the signing client, a second package manager file and a second signing request to cryptographically sign the second package manager file, wherein the second package manager file comprises a second header and a second payload;

inspect the second header of the second package manager file to determine whether the second header includes a second digest; and responsive to determining that the second header does not include the second digest, cause the processing device to:

send the second package manager file, including the second payload, from the signing client to the signing server; and receive a second signed package manager file from the signing server.

18. The non-transitory computer-readable storage medium of claim 15, wherein the signing server is implemented within a secure vault.

19. The non-transitory computer-readable storage medium of claim 15, wherein to inspect the header to determine whether the header includes the digest comprises to determine whether the header includes a digest field.

20. The non-transitory computer-readable storage medium of claim 15, wherein to inspect the header to determine whether the header includes the digest comprises to identify the version of the package manager used to generate the package manager file.

* * * * *